United States Patent Office 3,511,682
Patented May 12, 1970

3,511,682
PRODUCTION OF SINTERED POLY-
TETRAFLUOROETHYLENE FILMS ON
ELASTOMERS
Arthur G. Sands, Cheverly, Md., and Earl J. Kohn, Springfield, Va., assignors to the United States of America as represented by the Secretary of the Navy
No Drawing. Continuation-in-part of application Ser. No. 302,216, Aug. 14, 1963. This application Dec. 30, 1965, Ser. No. 517,798
Int. Cl. B44d 1/44; B32b 27/08
U.S. Cl. 117—46                                     6 Claims

ABSTRACT OF THE DISCLOSURE

A thin film of polytetrafluoroethylene is sintered directly on vulcanized synthetic elastomers by rapid heating of a thin dry film of the polymer.

---

The invention described herein may be manufactured and used by or for the Government of the United States of America for governmental purposes without the payment of any royalties thereon or therefor.

This invention relates to a method of producing thin films of sintered polytetrafluoroethylene on elastomers.

This application is a continuation-in-part of our copending application, Ser. No. 302,216, filed Aug. 14, 1963, now abandoned.

Elastomers, characteristically, have a high coefficient of friction and under functional conditions of use will incur a high rate of wear of the contact surfaces. A dry lubricant film on the contact surface of the elastomer would reduce frictional wear and lengthen the service life of the elastomer.

Polytetrafluoroethylene is a waxy solid of low coefficient of friction which as a sintered or fused thin film has been used on metal surfaces as a dry lubricant. It is applied to metals by coating the metal surface with a moist thin film of the polymer particles from an aqueous dispersion of finely divided polytetrafluoroethylene, usually by spraying, air drying the moist thin film and sintering the airdried film by heating it and the metal substrate to temperatures above the fusion point of polytetrafluoroethylene which is 621° F. Sintering or fusion causes the polymer particles in the film to coalesce which increases the strength of the film through particle cohesion and gives better adhesion of the film to the metal.

The method of sintering polytetrafluoroethylene films on metal as described above in which the metal substrate as well as the polymer film is heated to temperatures above the fusion point of the polymer is obviously not appropriate for sintering films of the polymer on elastomers due to the adverse effect of the high degree of heat on the physical properties of elastomers.

It is an object of the present invention to provide a method of forming thin continuous films of sintered polytetrafluoroethylene on elastomers without appreciably adversely affecting the physical properties of the substrate elastomer.

We have found by our invention that dry thin films of polytetrafluoroethylene which are directly coated on elastomers, hereinafter identified, can be sintered to form a thin continuous film of the sintered polymer on the elastomer substrate without appreciably adversely affecting the physical properties of the elastomer by rapidly heating the dry thin polymer film on the elastomer to a temperature above the fusion point for polytetrafluoroethylene with heat which is applied directly to and over the face of the thin polymer film from a high temperature flame.

Elastomers which may be coated with a thin continuous film of sintered polytetrafluoroethylene by the method of the invention are vulcanized butadiene-styrene copolymers, vulcanized butadiene-acrylonitrile copolymers, vulcanized polychloroprene and vulcanized vinylidene fluoride-hexafluoropropylene copolymers.

Research conducted since the filing of the parent application, above, and reported by us in NRL Report 6298 has shown that the flame fusion method herein described is not successful for the formation of a thin continuous film of sintered polytetrafluoroethylene on substrates of vulcanized natural rubber or of vulcanized silicone rubber. A sintered polymer film prepared by the flame fusion method on a vulcanized natural rubber substrate was revealed by microscopic examination to be cracked, with the sintered polymer as islands on the substrate. The fissures in the film allowed heat of the flame to reach the rubber substrate and substantial degradation of the physical properties of the natural rubber substrate resulted from the flame treatment. The flame sintering of a thin film of polytetrafluoroethylene on a vulcanized silicone rubber was unsuccessful because of excessive cracking of the sintered film induced by the flame.

In the practice of the invention the high temperature flame may be moved over the face of the polymer film or, alternatively, the film and substrate elastomer may be moved by suitable means relative to the flame in a stationary position. Heating of the polymer film to above the fusion temperature can be accomplished by passing the flame over successive sections of the film. Proceeding in this way and with the polymer film at room temperature, it will generally be found that the first section of the film to be heated will require more passes of the flame thereover to heat the polymer to above the fusion temperature than will the next and succeeding sections of the film by reason of heat accumulation which preheats the latter. A preheating of the polymer film below the fusion temperature by rather rapidly playing the flame over the surface of the film may be practiced without damage to the elastomer substrate.

The sintered condition of the thin polymer film on the elastomer substrate may be visually determined by observing a distinct change in shade of the color of a polymer which contains a pigment, such as a polymer which is pigmented with chromic oxide and takes on a distinctly duller shade of green when sintered. A thin film of clear polymer appears white in the unsintered condition and becomes transparent when sintered.

The sintered condition of the polymer is related to the cohesive strength of the film and the adhesion of the film to the substrate. An unsintered film has little cohesive strength and is lightly adhered to a substrate and can be removed by movement of the thumb nail through the film. An adhesive tape test may be employed for determining sintering of the polymer film. In this test a pressure-sensitive adhesive tape (Scotch brand) is adhered to the surface of the polymer film which has been heated to above the fusion temperature and then, with a quick motion, is pulled from the film. Unsintered polymer particles do not cohere to one another and will be lifted from the surface of the polymer film by the adhesive of the tape. By repeated application of the adhesive tape to an unsintered film, the whole of the film will eventually be removed from the substrate.

Flames of temperature in the range of from about 2500 to 3500° F. are preferred for the sintering of thin films of the polymer on the elastomers in accordance with the method of the invention, although flames of higher temperature may also be used. Natural gas burned with air or oxygen may be used for producing flames with temperatures in the range of 2500 to 3500° F., and is a preferred fuel from the standpoint of cost and availability. The rate of pass of the flame over the face of the thin polymer film and the distance of the tip or end of the flame from the film for effecting the heating of the polymer to above the fusion point will depend upon the temperature of the flame employed. For example, a flame, the temperature of which is 2660° F., will heat a thin film of the polymer on an elastomer substrate to above the fusion point for sintering of the polymer when moved over the face of the polymer film at a rate of pass of 6 feet per minute with the tip or end of the flame held a distance of 1/8 inch from the surface of the polymer film. Flames of a higher temperature will require a higher rate of pass and/or a greater distance of the tip or end of the flame from the surface of the polymer film. Conversely, those of lower temperature will require a higher rate of pass and/or a shorter distance of the tip or end of the flame from the surface of the polymer film. The rate of pass and distance of the tip or end of the flame from the surface of the polymer film which is suitable for heating the polymer to above the fusion point may be determined by the simple expedient of trial and error, the temperature of the flame having been determined and the sintered condition of the polymer being visually observable. Heating of the polymer film to temperatures which will cause decomposition of the polymer are obviously to be avoided.

A thin film of unsintered polytetrafluoroethylene may be applied to a surface of the elastomer substrate by spray-coating, using an aqueous dispersion of finely divided polytetrafluoroethylene sold commercially under the trade name Teflon (Du Pont Company). The thickness of the polymer film on the elastomer may be of the order of from about 0.2 to 0.4 mil. The spray coat is moist with water and in order to avoid cracking and blistering of the coating by steam which would be developed in the sintering operation, the wet film is dried to remove water. This drying may be carried out by allowing the moist polymer film on the substrate to stand overnight in the air at room temperature and then heating it for about two hours in a forced-air circulating oven operated at 50° C.

The invention is further illustrated by the following specific examples of the application of the method. The several synthetic rubbers were compounded and vulcanized in a known way. The surface of the vulcanized synthetic rubber was cleaned by wiping with acetone. The flame employed for the sintering of the thin film of polytetrafluoroethylene was produced by burning natural gas with air in a commercial blow torch (National Welding Equipment Company Type 3A Blow Pipe) equipped with an N-2 nozzle. The temperature of the flame was measured by a thermocouple (Pt-PtRh) at a point 1/8 inch in advance of the inner cone of the flame.

EXAMPLE 1

A sheet, 6" x 6", of vulcanized vinylidene fluoride-hexafluoropropylene rubber, Viton B, with Shore A hardness number 75, was spray-coated on one face with a thin film of polytetrafluoroethylene, using a commercial aqueous dispersion of finely divided polytetrafluoroethylene containing a green pigment (Du Pont One Coat Enamel 851-204). The moist polymer film was dried on the elastomer by standing in air at room temperature overnight about 16 hours) followed by heating for 2 hours in an air-circulating oven operated at 50° C. The dried polymer film had a thickness of approximately 0.3-0.4 mil. The elastomer bearing the dried polymer film was mounted on a fiberboard and arranged in a vertical position for the sintering. The flame used for the sintering was produced by burning natural gas with air. The temperature of the flame was 2660° F. and the flame had an inner cone of 1 inch length, burner to cone tip, and an overall length of 1½ inches. The sintering was conducted by passing the flame, section by section, over the face of the dried polymer film, beginning at the top of the film and advancing to the next lower and succeeding sections as the polymer in each section was sintered. The tip of the flame was held at a distance of 1/8" from the surface of the polymer film and moved over the surface at the rate of about 6 feet per minute. Three passes of the flame over the first section of the film were required for sintering the polytetrafluoroethylene therein. The sintered section of the film was of a distinctly duller green shade than the unsintered polymer. Sintering of the polymer in the next and succeeding sections was accomplished by a single pass of the flame thereover due to a preheating of them by the sintering of the previous section or sections. A thin continuous film of the sintered polymer was formed on the substrate elastomer. If desired, the substrate elastomer may be cooled by quenching in water, although this step is not necessary.

Example 2

Repeating the procedure of Example 1, the elastomers: vulcanized butadiene-styrene rubber (Philprene 1500F), vulcanized butadiene-acrylonitrile rubber (Hycar 1011) and vulcanized polychloroprene (neoprene), all of Shore A hardness number 85, in the form of sheets, 6" x 6", were provided on one face of each of the sheets with an air-dried thin film of polytetrafluoroethylene of approximately 0.3-0.4 mil thickness and the dried thin polymer film sintered on the respective substrate elastomers by heat applied thereto from a flame of temperature 2660° F. A thin continuous film of the sintered polymer was formed on the respective elastomer substrates in each instance.

The thin films of polytetrafluoroethylene heated to above the fusion point on the several elastomers by the method of the invention in the above examples were tested for the sintered condition of the polytetrafluoroethylene by the pressure-sensitive adhesive tape test. The tape tests showed essentially no particles of the polymer to have been taken up by the adhesive from the surface of the polymer films for all of the films.

The weight loss in the elastomer on which the thin film of polytetrafluoroethylene is fused by the application of flame heating to the polymer film in accordance with the invention is of very small order. The weight loss of the elastomer as determined for the vulcanized vinylidene fluoride-hexafluoropropylene rubber, the vulcanized butadiene-styrene rubber, the vulcanized butadiene-acrylonitrile rubber and the vulcanized polychloroprene rubber substrates on which the polymer films were sintered in the above examples was .03%, .08%, .06% and .05%, respectively. The percent change in tensile strength and in elongation was determined for these elastomer substrates. The percent change in tensile strength was found to be −3.7%, +18%, −5.2% and +9.5%, respectively, and the percent change in elongation to be −4.8%, 0%, 0% and −13.2%, respectively. The percent change in tensile strength and in elongation of the substrate elastomers will vary more widely than the loss in weight therefor, but will not, in general, be great enough to significantly diminish the elastic character of the substrate.

Elastomers which have been provided on a surface thereof with an adherent, thin continuous film of sintered polytetrafluoroethylene by the method of the invention will incur reduced frictional wear of the elastomer under conditions in which a metal part is to be moved in contact with the elastomer, and may be used in the form of strips applied to metal parts which are to be moved in sliding or rotational engagement to reduce friction on movement of the parts.

Since the invention described herein may be variously embodied without departing from the spirit or scope thereof, it is to be understood that specific embodiments appearing in the above description are to be taken by way of illustration and not in limitation except as may be defined in the appended claims.

What is claimed and desired to be secured by Letters Patent of the United States is:

1. A method of providing a thin continuous film of sintered polytetrafluoroethylene on an elastomer of the group consisting of vulcanized copolymers of butadiene and styrene, vulcanized copolymers of butadiene and acrylonitrile, vulcanized polychloroprene and vulcanized copolymers of vinylidene fluoride and hexafluoropropylene which comprises rapidly heating a thin dry film of polytetrafluoroethylene coated directly on an elastomer of said group to a temperature above the fusion point for polytetrafluoroethylene but below the decomposition temperature therefor by applying heat from a high temperature flame directly to and over the face of said film.

2. A method as defined in claim 1, wherein said dry film of polytetrafluoroethylene is formed on the elastomer by spray-coating a thin film of polytetrafluoroethylene on a surface of the elastomer from an aqueous dispersion of finely divided polytetrafluoroethylene and air-drying said film on the surface of the elastomer.

3. A method as defined in claim 2, wherein the elastomer is a vulcanized copolymer of butadiene and styrene.

4. A method as defined in claim 2, wherein the elastomer is a vulcanized copolymer of butadiene and acrylonitrile.

5. A method as defined in claim 2, wherein the elastomer is vulcanized polychloroprene.

6. A method as defined in claim 2, wherein the elastomer is a vulcanized copolymer of vinylidene fluoride and hexafluoropropylene.

References Cited

UNITED STATES PATENTS

| | | | |
|---|---|---|---|
| 3,304,221 | 2/1967 | Eggleton | 161—189 |
| 2,470,772 | 5/1949 | Haas | 117—138.8 X |
| 2,752,317 | 6/1956 | Sudekum | 117—138.8 X |
| 2,764,505 | 9/1956 | Kilbourne et al. | 117—161 X |
| 2,937,156 | 5/1960 | Berry | 117—126 X |
| 2,974,059 | 3/1961 | Gemmer | 117—46 X |
| 3,088,938 | 5/1963 | Cluff | 260—87.7 |
| 3,170,811 | 2/1965 | Sands | 117—138.8 X |

WILLIAM D. MARTIN, Primary Examiner

J. E. MILLER, Jr., Assistant Examiner

U.S. Cl. X.R.

117—138.8, 161; 161—189